(12) United States Patent
Oiso et al.

(10) Patent No.: US 7,108,897 B2
(45) Date of Patent: Sep. 19, 2006

(54) DYE TYPE POLARIZING PLATE

(75) Inventors: Shoji Oiso, Saitama (JP); Kumiko Ishii, Saitama (JP); Yoshitaka Kajiwara, Saitama (JP); Toru Tabei, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/898,817

(22) Filed: Jul. 26, 2004

(65) Prior Publication Data

US 2005/0003109 A1    Jan. 6, 2005

Related U.S. Application Data

(62) Division of application No. 10/018,851, filed as application No. PCT/JP00/04658 on Jul. 12, 2000, now Pat. No. 6,790,490.

(30) Foreign Application Priority Data

| Jul. 14, 1999 | (JP) | ........................... 11/200435 |
| Jul. 26, 1999 | (JP) | ........................... 11/211148 |
| Aug. 20, 1999 | (JP) | ........................... 11/234058 |

(51) Int. Cl.
*C09B 45/24* (2006.01)
*C09B 31/072* (2006.01)

(52) U.S. Cl. ............... 428/1.31; 428/1.54; 349/80; 349/97; 349/165; 359/491; 534/577; 534/683; 534/685; 8/489

(58) Field of Classification Search ............ 428/1.31, 428/1.54; 349/79–80, 97, 165; 359/491; 534/577, 689–690, 683, 685; 8/639, 641, 8/681, 687, 489
See application file for complete search history.

(56) References Cited

U.S. PATENT DOCUMENTS

| 4,749,259 | A | * | 6/1988 | Ledebuhr ........................ 349/8 |
| 5,084,807 | A | * | 1/1992 | McKechnie et al. ........ 362/228 |
| 5,272,259 | A | | 12/1993 | Claussen et al. ............ 534/689 |
| 5,446,135 | A | | 8/1995 | Misawa et al. ............. 534/714 |
| 5,548,073 | A | | 8/1996 | Misawa et al. ............. 534/690 |
| 5,739,298 | A | | 4/1998 | Misawa et al. ............. 534/689 |
| 5,753,145 | A | | 5/1998 | Teng et al. ................. 252/585 |
| 6,399,752 | B1 | * | 6/2002 | Ohta et al. .................. 534/806 |
| 6,552,849 | B1 | | 4/2003 | Furuhashi et al. .......... 359/491 |

FOREIGN PATENT DOCUMENTS

| JP | 59-145255 | 8/1984 |
| JP | 60-156759 | 8/1985 |
| JP | 60-168743 | 9/1985 |
| JP | 63-189803 | 8/1988 |
| JP | 1-313568 | 12/1989 |
| JP | 3-012606 | 1/1991 |
| JP | 3-78703 | 4/1991 |
| JP | 60-156759 | 8/1992 |
| JP | 5-295281 | 11/1993 |
| JP | 9-132726 | 5/1997 |
| JP | 10-259311 | 9/1998 |
| JP | 11-125815 | 5/1999 |
| JP | 11-218610 | 8/1999 |

OTHER PUBLICATIONS

Thompson Corporation Machine-Assisted English Translation JP 10-259311, Ogino et al., Sep. 1998.*
Matsuo et al., Aug. 16, 1985, English Abstract Japan 60156759.

* cited by examiner

*Primary Examiner*—Harold Pyon
*Assistant Examiner*—Sow-Fun Hon
(74) *Attorney, Agent, or Firm*—Nields & Lemack

(57) ABSTRACT

This invention relates to a polyvinyl alcohol type polarizing film or plate which comprises a water-soluble dye having the formula (1) in a free acid form or a copper complex salt thereof. The said polarizing plate has excellent polarizing performance capability and durability, and is suitably used for the green channel of a liquid crystal projector when B in formula (1) is a benzoylamino group and the water-soluble dye has a wave length for maximum absorption ($\lambda$max) of 520 nm or more and less than 580 nm

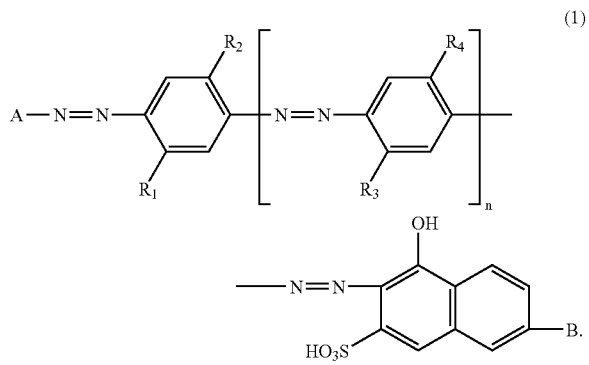

8 Claims, No Drawings

DYE TYPE POLARIZING PLATE

This application is a divisional of U.S. Ser. No. 10/018,851 filed Dec. 17, 2001, now U.S. Pat. No. 6,790,490, which is a 371 of PCT/JP00/04658 filed on Jul. 12, 2000, the disclosures of which are incorporated herein by reference.

TTECHNICAL FIELD

This invention relates to a novel polyvinyl alcohol type polarizing plate. Further, it relates to a polarizing plate for use in a liquid crystal projector and a color liquid crystal projector and, more in particular, it relates to a polarizing plate for use in a liquid crystal projector which is excellent both in brightness and polarizing performance and suitable to the use for a green channel, as well as a color liquid crystal projector using the polarizing plate.

BACKGROUND ART

A polarizing plate having light transmission and shielding functions is a basic constituent factor, together with a liquid crystal having a light switching function, of a liquid crystal display (LCD). The application use of LCD has been extended generally from that for small sized equipments such as pocket calculators and watches at the time of initial stage to that for notebook type personal computers, word processors, liquid crystal projectors, liquid crystal television sets, car navigations and measuring instruments for indoor and outdoor use, and they are used under wide working conditions including from low temperature to high temperature and low humidity to high humidity, so that a polarizing plate having high polarizing performance and excellent durability has been demanded.

At present, a polarizing plate is manufactured by incorporating iodine or dichroic dye as a polarizer in a stretched and oriented a film of polyvinyl alcohol or a derivative thereof. Alternatively, it is manufactured from a polyene type film by preparing a polyene through dehydrochlorination of a polyvinyl chloride film or dewatering of a polyvinyl alcohol type film and then orienting the same. Among them, the iodine type polarizing plate using iodine as a polarizer is excellent in the initial polarizing performance but is sensitive to water and heat and involves a problem in the durability when it is used under high temperature and high humidity state for a long time. For improving the durability, methods of treating with formalin or a boric acid-containing aqueous solution or using a polymer film of low moisture permeability as a protective film has been considered but this is not yet sufficient. On the other hand, a dye type polarizing plate using a dichroic dye as the polarizer is excellent in moisture proofness and heat resistance compared with the iodine type polarizing plate but the initial polarizing performance is not generally sufficient.

Further, in a polarizing plate of a neutral color prepared by adsorption and orientation of several kinds of dichroic dyes in a polymer film, when light leakage (color leakage) occurs at a specified wavelength in a visible light region, particularly, in a wavelength region from 400 to 700 nm in a state of stacking two polarizing plates such that their orienting directions are perpendicular to each other (crossed state), hue of the liquid crystal display sometimes changes in the dark state when the polarizing plate is attached to a liquid crystal panel. In view of the above, for preventing discoloration of the liquid crystal display due to color leakage for a specified wavelength in the dark state when the polarizing plate is attached to the liquid crystal display device, the transmittance in the crossed state (transmittance for crossed state) has to be lowered uniformly in a visible light region, particularly in a wavelength region from 400 to 700 nm.

Further, in a case of a color liquid crystal projection type display, that is, a color liquid crystal projector, a polarizing plate is used for the liquid crystal image forming portion. However, the brightness is reduced inevitably due to significant absorption of light by the polarizing plate and magnification of an image of a small area of 0.9 to 6 inch into about several tens inch to one hundred and several tens inch, so that a light source at a high luminosity is used. In addition, there is a continuous demand for the further increase of the brightness of the liquid crystal projector and, as a result, the intensity of the light source used increases more and more.

By the way, a neutral gray iodine type polarizing plate having satisfactory polarizing performance has generally been used as a polarizing plate for a liquid crystal image forming area of a color liquid crystal projector. However, the iodine type polarizing plate involves a problem that light fastness, heat resistance and wet heat resistance are not sufficient because the polarizer is iodine. In order to solve the problem, a neutral gray polarizing plate using a dye type dichroic colorant as a polarizer has been used. In the neutral gray polarizing plate, dyes of trichromatic colors are used in combination in order to improve the transmittance and the polarizing performance in average in the entire visible ray wavelength region (400 to 700 nm). Accordingly, to the market's demand for more brightness as in the color liquid crystal projector, the light transmittance is poor and it involves a problem that the intensity of the light source has to be increased more to attain bright display. In order to solve the problem, three polarizing plates, that is, for blue channel, green channel and red channel corresponding to the trichromatic colors have become used.

As the dye used for the manufacture of a polarizing plate, Japanese Patent Publication No. 2844360 describes, for example, a water soluble dye of the following formula (7) in Example 1.

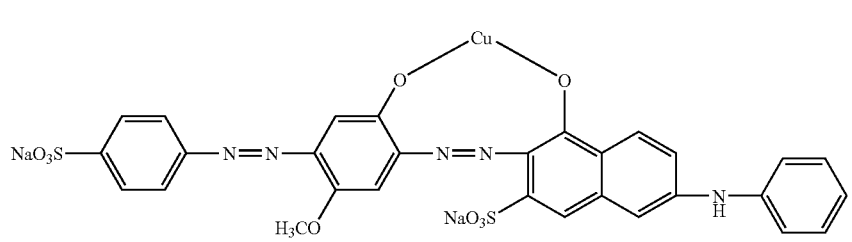

(7)

However, the polarizing plate containing the existent water soluble dye described above has not yet completely satisfied the needs of users sufficient in view of the polarization characteristics, absorption wavelength region and the hue.

Further, among the three polarizing plates corresponding to trichromatic colors of a color liquid crystal projector, that is, for blue channel, green channel and red channel, the polarizing plate for use in the green channel (green light) lacks both in favorable brightness and polarizing performance and improvement therefor has been demanded.

An object of this invention is to provide a high performance polarizing plate having excellent polarizing performance, moisture proofness and heat resistance. Further, another object of the invention is to provide a high performance neutral color polarizing plate formed by adsorbing and orienting two or more kinds of dichroic dyes in a polymer film, which causes no color leakage at the crossed state in a visible light region, particularly, in a wavelength region of from 400 to 700 nm and has excellent polarizing performance and moisture proofness and heat resistance.

A further object is to provide a high performance polarizing plate excellent both in brightness and polarizing performance as a polarizing plate for use in green channel (green color light) among the three polarizing plates corresponding to the trichromatic colors of a colored liquid crystal projector.

DISCLOSURE OF THE INVENTION

In order to attain the objects described above, the present inventors have made an earnest study and, as a result, have found that a polarizing film and a polarizing plate containing a specified dye has excellent polarizing performance and moisture proofness and heat resistance, and further found that a polarizing plate excellent in the polarizing performance and the durability and with less color leakage in the visible light region can be obtained by incorporating a specified selected dye for providing a polarizing plate having a neutral color together with the above-mentioned specified dye and further that a polarizing film and a polarizing plate favorable both in the brightness and the polarizing performance suitable for use in a green channel (for green light) can be obtained by incorporating a specified dichroic dye alone or together with a selected other dye and have accomplished this invention.

That is, this invention concerns:

1. A polyvinyl alcohol type polarizing film containing, in a substrate for the polarizing film, a water soluble dye represented by the following formula (1) in the form of a free acid:

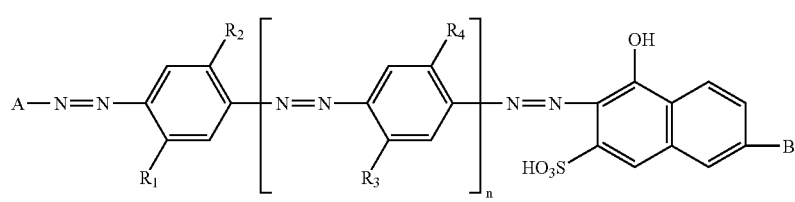

[where A represents the following formula (2)

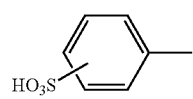

B represents the following formula (4) when A represents the formula (2);

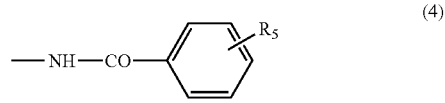

and n is 1, $R_5$ in the formula (4) represents an amino group or a hydroxyl group, or A represents the following formula (3)

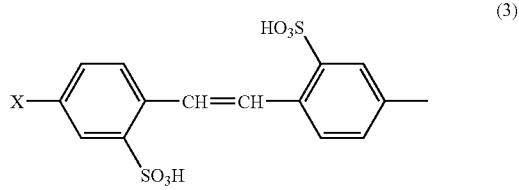

{where X represents a nitro group or an amino group}, B represents the following formula (5) when A represents the formula (3):

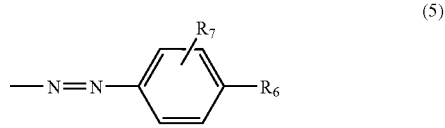

and n is 0 or 1 {where $R_6$ represents a hydrogen atom, hydroxyl group, substituted or unsubstituted amino group, methyl group, ethyl group, methoxy group or ethoxy group, $R_7$ represents a hydrogen atom, hydroxyl group, substituted or unsubstituted amino group, methyl group, ethyl group, methoxy group or ethoxy group in the formula (5)}, $R_1$, $R_2$, $R_3$, $R_4$ each independently represents a hydrogen atom, methyl group, ethyl group, methoxy group, ethoxy group and acetyl amino group, on the proviso of excluding the case where all of $R_1$. $R_2$. $R_3$ and $R_4$ are methyl group or methoxy group and a case where $R_1$ and $R_3$ are methyl group and $R_2$ and $R_4$ are methoxy group when n is 1, A represents the formula (2) and B represents the formula (4)] or a copper complex salt dye thereof.

2. A polyvinyl alcohol type polarizing film as set forth in article 1 above, having at least one of the water soluble dyes represented by the formula (1) or the copper complex salt thereof and at least one of organic dyes other than above.

3. A polyvinyl alcohol type polarizing plate having a protective film on the surface of the polyvinyl alcohol type polarizing film as set forth in any one of articles 1 and 2 above.
4. A polarizing film for polyvinyl alcohol for a green channel used for a liquid crystal projector containing, in a substrate for a polarizing film, a water soluble dye represented by the following formula (6) in a free acid form:

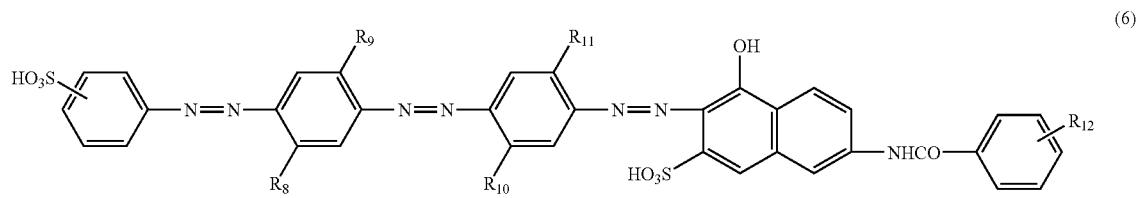

(6)

where ($R_8$, $R_9$, $R_{10}$, and $R_{11}$ each represents independently a hydrogen atom, methyl group, ethyl group, methoxy group, ethoxy group and acetyl amino group. $R_{12}$ represents a hydrogen atom, amino group or hydroxyl group) and having a maximum absorption wavelength ($\lambda$max) of 520 nm or more and less than 580 nm.
5. A polarizing film for polyvinyl alcohol for a green channel used for a liquid crystal projector containing at least one of water soluble dyes represented by the formula (6) as set forth in article 4 above and at least one of organic dyes other than described above.
6. A polyvinyl alcohol type polarizing plate for a green channel used for a liquid crystal projector as set forth in article 4 or 5 above wherein the average light transmittance for the crossed state at 630 nm to 780 nm is 60% or more.
7. A polyvinyl alcohol type polarizing plate for a green channel used for a liquid crystal projector having a protective film on the surface of a polyvinyl alcohol type polarizing film as set forth in article 4 above.
8. A color liquid crystal projector having the polarizing plate as set forth in article 7 above in a green channel portion.

The polarizing plate containing one or more of the water soluble dyes represented by the formula (1) or the copper complex salt dyes thereof is excellent in the polarizing performance and excellent in the moisture proofness and the heat resistance. Further, the polarizing plate containing one or more of the water soluble dyes represented by the formula (1) or copper complex salt dyes thereof and one or more of other organic dyes is excellent in any of the polarizing performance, the moisture proofness and the heat resistance and has a neutral color (gray).

Further, the polarizing plate used for the liquid crystal projector having polarizing film containing one or more of water soluble dyes represented by the formula (6) and having a maximum absorption wavelength ($\lambda$max) of 520 nm or more and less than 580 nm is favorable both in the brightness and the polarizing performance as a polarizing plate for the green channel (green light).

BEST MODE FOR PRACTICING THE INVENTION

At first, the water soluble dye represented by the formula (1) or the copper complex salt dye thereof used for the polarizing film of this invention is to be explained.

The water soluble dye represented by the formula (1) or the copper complex salt thereof used for the polarizing film of this invention includes two kinds of a dye group in which A represents the formula (2), B represents the formula (4) and n is 1 and a dye group in which A represents the formula (3), B represents the formula (5) and n is 0 or 1, each of which may be in the form of a free acid and a salt.

The salt can include, for example, alkali metal salt such as sodium salt, potassium salt and lithium salt, ammonium salt, ethanol amine salt and alkyl amine salts, sodium salt being usually preferred.

Further, in this invention, the polarizing film containing the water soluble dye represented by the formula (1) or the copper complex salt dye thereof means a polarizing film obtained usually by dyeing the polarizing film substrate with the dye described above and stretching the same, in which the dye may be present on the surface of the film substrate or in the inside of the film, both of the cases being included.

In the dye group where A represents the formula (2), B represents the formula (4) and n is 1, among the water soluble dyes represented by the formula (1) used in this invention, the substitution position of the sulfonic group in the formula (2) is preferably the para-position relative to the azo group. $R_1$, $R_2$, $R_3$ and $R_4$ each represents independently a hydrogen atom, methyl group, ethyl group, methoxy group, ethoxy group or acetylamino group, and a compound in which $R_1$ and $R_2$ each represents a hydrogen atom, methyl group, methoxy group or acetyl amino group and $R_3$ and $R_4$ each represents independently a methyl group, ethyl group or methoxy group is preferred. A compound where both of $R_1$ and $R_2$ are hydrogen atoms is more preferred. A preferred compound in this case can include, a compound where both of $R_3$ and $R_4$ are methyl group or ethyl group and a compound where both of $R_3$ and $R_4$ are methyl group is most preferred. $R_5$ in the formula (4) represents an amino group or hydroxyl group and the amino group is preferable. The substitution position of $R_5$ is particularly preferably a para-position relative to the —NHCO— group. Typical examples of the dye group where A represents the formula (2), B represents the formula (4) and n is 1 are shown below in the form of free acids:

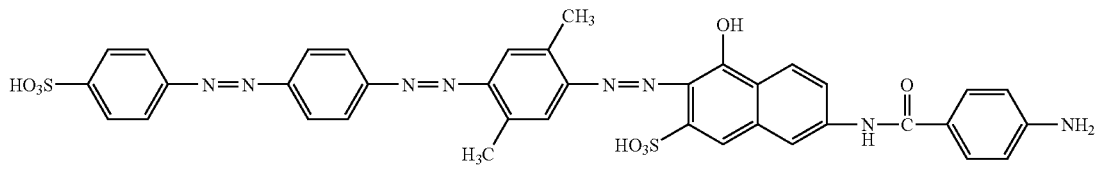

No 1

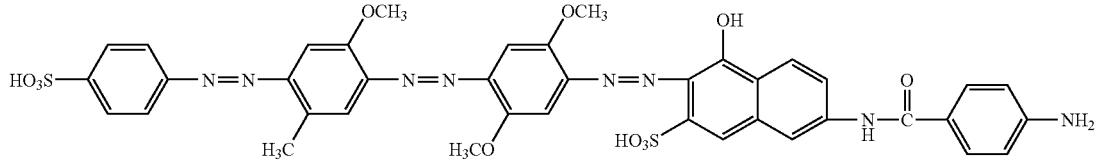

No 2

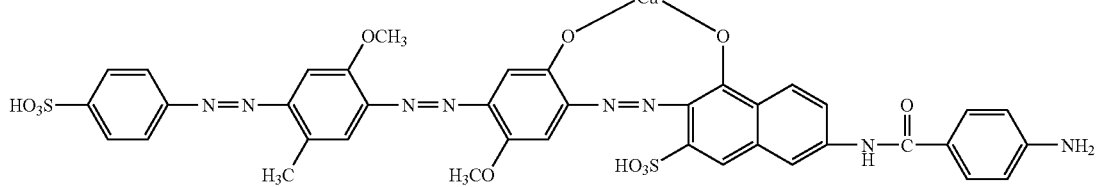

No 3

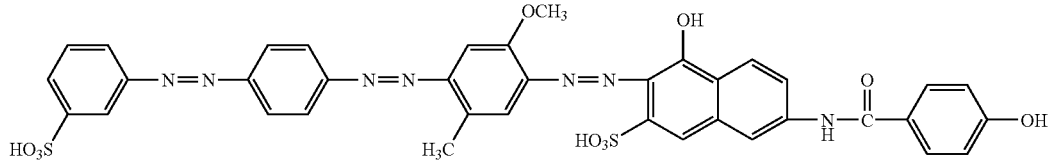

No 4

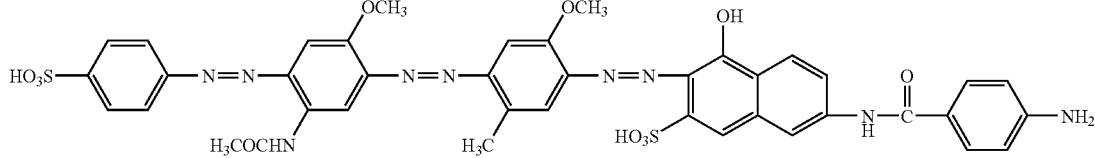

No 5

Further, in the dye group where A represents the formula (3), B represents the formula (5) and n is 0 or 1 in the formula (1) among the water soluble dyes represented by the formula (1) used in this invention, X in the formula (3) represents a nitro group or amino group, with the nitro group being preferred. $R_1$, $R_2$, $R_3$ and $R_4$ each represents independently a hydrogen atom, methyl group, ethyl group, methoxy group, ethoxy group or acetylamino group and a compounds in which $R_1$ and $R_2$ each represents a methyl group, methoxy group or acetylamino group and n is 0 is preferred and a compound in which $R_1$ is a methyl group or methoxy group and $R_2$ is a methoxy group is more preferred. Further, a compound in which both of $R_1$ and $R_2$ are methoxy group is particularly preferred. $R_6$ in the formula (5) represents a hydrogen atom, hydroxyl group, substituted or unsubstituted amino group, methyl group, ethyl group, methoxy group or ethoxy group, with the hydroxyl group being preferred. $R_7$ in the formula (5) represents a hydrogen atom, hydroxyl group, substituted or unsubstituted amino group, methyl group, ethyl group, methoxy group or ethoxy group, with the hydrogen group, hydroxyl group or carbamoyl group being preferred and the hydrogen atom or hydroxyl group being more preferred. The substituted amino group in $R_6$ and $R_7$ can include, for example, a lower alkyl amino group such as a methylamino group, a carbamoyl amino group or a lower acyl amino group such as an acetylamino group. The substitution position of $R_7$ is preferably the ortho-position relative to the azo group.

In this invention, the term "lower" means those having carbon atoms of from 1 to 5 and, more preferably, carbon atoms of 1 to 3.

Then, among the water soluble dyes represented by the formula (1) used in this invention, typical examples of the dye group in which A represents the formula (3), B represents the formula (5) and n is 0 or 1 are shown below in the form of free acids.

No 6

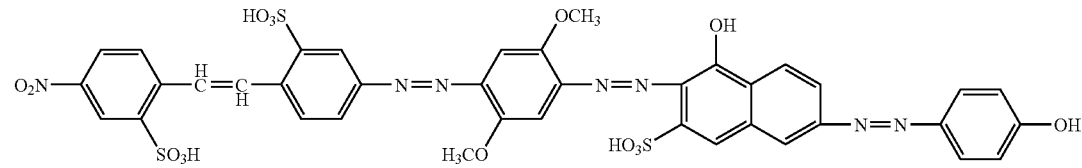

-continued
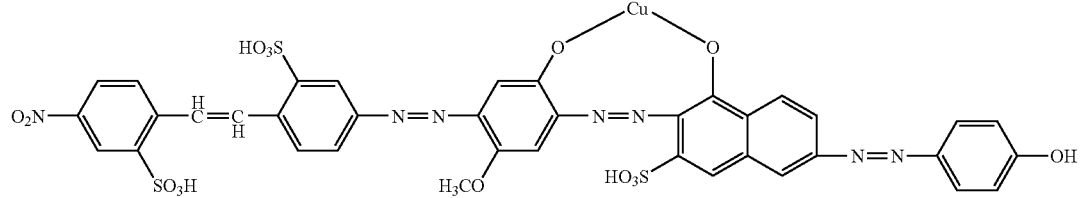
No 7
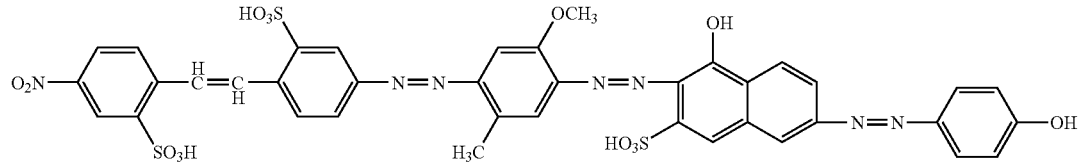
No 8
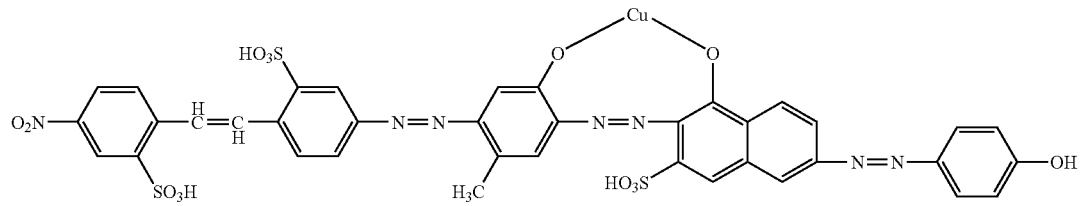
No 9
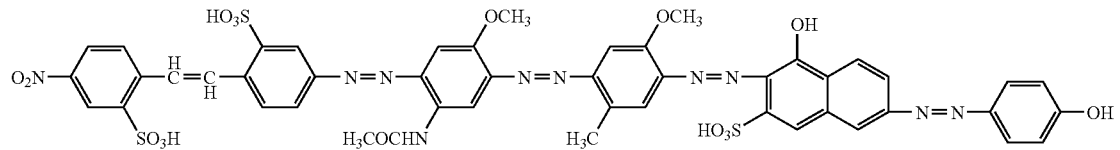
No 10
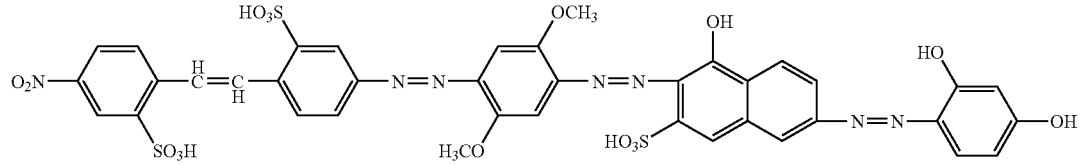
No 11
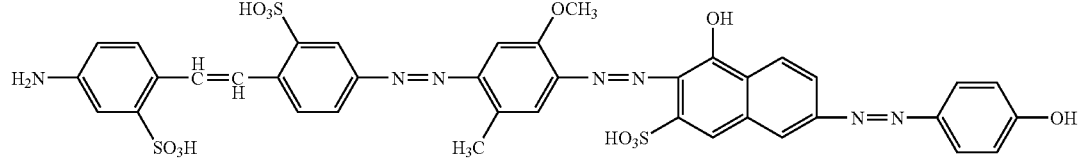
No 12
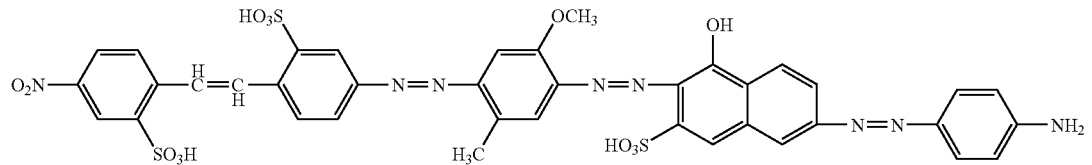
No 13
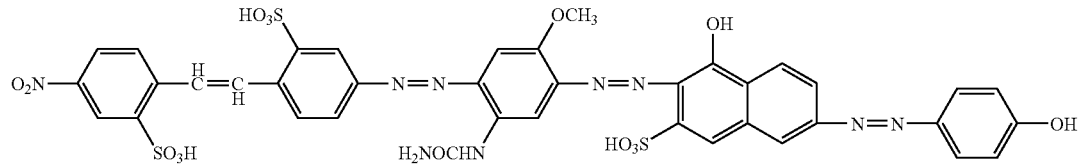
No 14

-continued

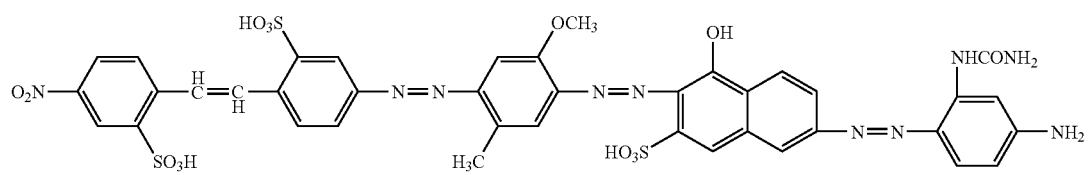

No 15

Then, description is to be made to the water soluble dye used in the polarizing plate for the green channel used for the liquid crystal projector according to this invention.

The water soluble dye used for the green channel used for the liquid crystal projector in this invention is used as a dichroic molecule and the water soluble dye can include the water soluble dye represented by the formula (6) and any of the water soluble dyes having a maximum absorption wavelength ($\lambda$max) of 520 nm or more and less than 580 nm can be used, which may be in the form of a free acid, as well as a salt. The salt can include, for example, alkali metal salts such as sodium salts, potassium salt and lithium salt, ammonium salt, ethanolamine salt and alkylamine salt, and sodium atom is preferable.

The water soluble dye represented by the formula (6) corresponds to the dye of the formula (1) in which A is a group represented by the formula (2), B is a group represented by the formula (4) an n is 1 and having a maximum absorption wavelength ($\lambda$max) of 520 nm or more and less than 580 nm and what are described for the formula (1) can be applied as they are also to the compound of the formula (6).

Then, typical examples of the water soluble dye represented by the formula (6) used in this invention are described below in the form of the free acid.

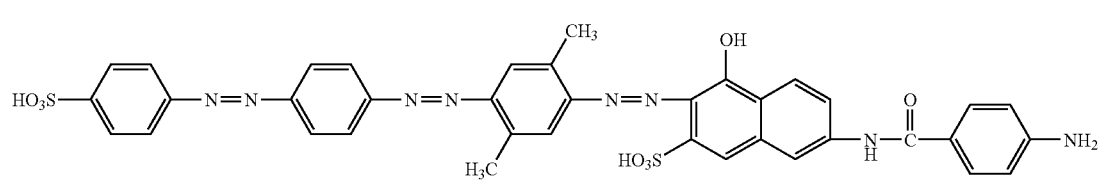

No 1

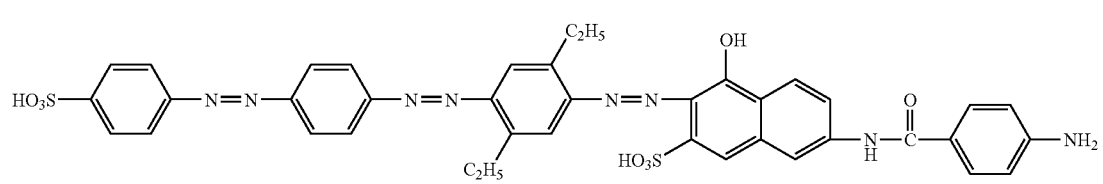

No 16

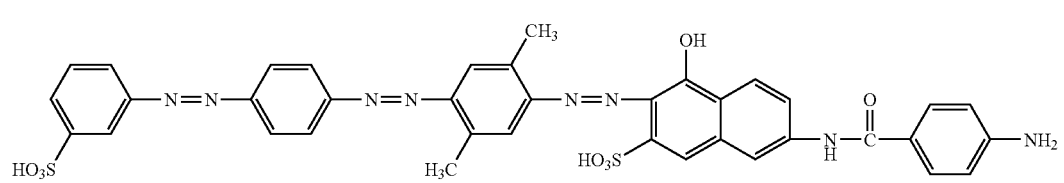

No 17

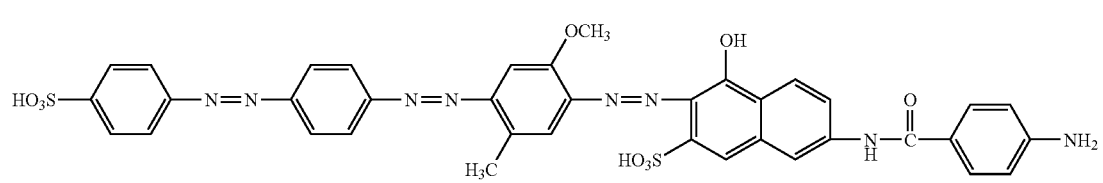

No 18

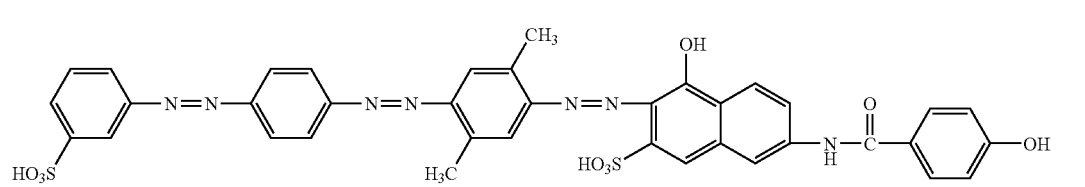

No 19

Any of the water soluble dye represented by the formula (1) used in this invention, a copper complex salt dye thereof or a water soluble dye represented by the formula (6) can be produced easily in accordance with a usual production process of azo dyes by conducting known diazotization, coupling and, optionally, formation of copper complex salt. Specific production process includes two methods for a dye group in which A represents the formula (2), B represents a formula (4) and n is 1 in the formula (1), and a dye group in which A represents the formula (3), B represents the formula (5) and n is 0 or 1. The methods are to be described more in details below.

(I) Production Process for a Dye Group in Which A Represents the Formula (2), B Represents the Formula (4) and n is 1 in the Formula (1):

Anilines substituted with a sulfonic acid group of the formula (2) is diazotized, subjected to primary coupling with anilines which may have a substituent to obtain a monoazoamino compound. Then, the monoazoamino compound is diazotized and subjected to secondary coupling with aniline which may have a substituent to obtain a disazoamino compound. The disazoamino compound is diazotized and subjected to a tertiary coupling with a naphhtol corresponding to an aimed compound, that is, N-benzoyl J acid in which the phenyl nuclei of the benzoyl group is substituted with an amino or hydroxyl group in an alkaline state to obtain a water soluble dye represented by the formula (1). Further, when formation of copper complex salt is conducted by a customary method using a copper sulfate or the like, a copper complex salt of the water soluble dye represented by the formula (1) is obtained.

The starting material for the dye group in which A represents the formula (2), B represents the formula (4) and n is 1 is anilines substituted with a sulfonic acid group and the anilines can include, for example, sulfanyl acid, methanyl acid and orthanilic acid.

The substituent of the aniline, which is a component for primary and secondary couplings and which may have a subsistent, can include methyl group, ethyl group, methoxy group, ethoxy group and acetyl amino group. The substituent group may be present by one or two on the phenyl group of the aniline. The bonding position relative to the amino group is either 2-position or 3-position in a case of having one substituent and 2-position and 5-position are preferred in a case of having two substituents. The anilines which may have a substituent can include, for example, aniline, 2-methyl aniline, 3-methyl aniline, 2-ethyl aniline, 3-ethyl aniline, 2-5-dimethyl aniline, 2,5-diethyl aniline, 2-methoxy aniline, 3-methoxy aniline, 2-methoxy-5-methyl aniline, 2,5-dimethoxy aniline and 2-methoxy-5-acetyl aminoaniline. The anilines may be protected at the amino group.

The protective group can include, for example, ω-methane sulfonic acid group thereof. The aniline used for the primary coupling and the aniline used for the secondary coupling may be identical or different with each other.

The N-benzoyl J acid that is naphthols as the tertiary coupling component in which the benzoyl group is substituted with one amino group or hydroxyl group can include, N-(4'-aminobenzoyl) J acid, N-(2'-aminobenzoyl) J acid, N-(4'-hydroxybenzoyl) J acid and N-(2'-hydroxybenzoyl) J acid.

For the N-benzoyl J acids in which the benzoyl group is substituted with one amino group or hydroxy group, a compound in which $R_5$ is an amino group can be obtained by benzoylation of the J acid with a nitro group-substituted benzoyl chloride by a known method and then reducing the nitration product by a known method. Further, N-benzoyl J acid in which $R_5$ is hydroxy group can also be formed by a known method.

Further, the water soluble dye represented by the formula (6) can be produced easily by the known diazodization and coupling method in accordance with the usual production process for the azo dyes in the same manner as the production process described above, to obtain the water soluble dye of the formula (6).

(II) Production Process for Dyes in Which A Represents the Formula (3), B Represents the Formula (5) and n is 0 or 1.

Sodium 4-nitro-4' aminostylbene-2,2'-disulfonate in which X in the formula (3) is a nitro group is diazotized and subjected to primary coupling with anilines which may have a substituent to obtain a monoazo amino compound. Then, the monoazo amino compound is diazotized and subjected to secondary coupling with anilines which may have a substituent to obtain a disazoamino compound. The disazoamino compound is diazotized and is subjected to tertiary coupling with naphthols substituted with an azo group represented by the formula (5) in an alkaline state to obtain a water soluble dye represented by the formula (1) where n is 1. For the water soluble dye of n is 0, when the diazotization production of the monoazoamino compound and naphthols substituted with the azo group represented by the formula (5) are subjected to a secondary coupling in an alkaline state, a water soluble dye represented by the formula (1) in which n is 0 and X is a nitro group can be obtained.

The water soluble dye represented by the formula (1) in which X is an amino group can be obtained by converting the nitro group of the water soluble dye represented by the formula (1) obtained as described above where the X is a nitro group into amino group. The nitro group can be converted into the amino group by reduction using sodium sulfide or the like.

Further, the copper complex salt of the water soluble dye represented by the formula (1) (copper complex salt dye) can be obtained by forming the copper complex salt from the water soluble dye obtained as described above by a customary method using copper sulfate or the like.

The starting material in a case where A represents the formula (3) is usually sodium 4-nitro-4'-aminostylbene 2,2'-disulfonate.

The substituent of the anilines, which may have a substituent and which are the primary or secondary coupling component, can include a methyl group, ethyl group, methoxy group, ethoxy group and acetyl amino group. The anilines may have 1 or 2 of such substituents on the phenyl group of the anilines. The coupling position relative to the amino group is at 2-position or 3-position in a case having one substituent and 2-position and 5-position are preferred in a case of having two substituents. Anilines which may have a substituent can include, for example, aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline and 2-methoxy-5-acetylaminoaniline. The anilines may be protected at the amino group.

The protective group can include, for example, ω-methane sulfonic acid group thereof. The anilines used for the first coupling and the anilines used for the secondary coupling may be identical or different with each other.

The naphthols substituted with the azo group represented by the formula (5) used in the final coupling step in the process described above can include, for example, 6-(4'-hydroxyphenylazo)-3-sulfonic acid-1-naphthol, 6-(2'-4'-dihydroxyphenylazo)-3-sulfonic acid-1-naphthol, 6-(2'-acetylamino-4'-hydroxyphenylazo)-3-sulfonic acid-1-naphthol, 6-(4'-aminophenylazo)-3-sulfonic acid-1-naphthol and 6-(4'-N methylaminophenylazo)-3-sulfonic acid-1-naphthol. The naphthols substituted with the azo group represented by the formula (5) can be obtained by tosylating and diazotizing J acid by a known method, coupling with phenols and anilines and then subjecting the same to detosylation. Further, the dye group where A represents the formula (3), B represents the formula (5) and n is 0 or 1 may be formed by conducting coupling using J acid instead of using naphthols substituted with the azo group represented by the formula (5) and then converting the amino group of the J acid into the azo group of the formula (5) by a customary method. That is, it can be obtained also by diazotizing the amino group of the coupled J acid and coupling with phenol groups or anilines having the substituent represented by $R_6$, $R_7$.

In the production process described above, the diazotization step is conducted by a normal method of mixing a nitrite such as sodium nitrite in an aqueous solution or suspension of the diazo ingredient in a mineral acid such as hydrochloric acid or sulfuric acid, or by a backward method of adding a nitrite to a neutral or weekly alkaline aqueous solution of the diazo ingredient and mixing the same with a mineral acid. The temperature for the diazotization is appropriately from −10 to 40° C. Further, the coupling step with the anilines is conducted by mixing an aqueous acidic solution of hydrochloric acid or acetic acid with the diazo solution described above at a temperature of from −10° C. to 40° C. under an acidic condition of pH 2 to 7.

The monoazo compound and the disazo compound obtained by the coupling can be put to the next step by separating it through filtration as it is or after precipitation by acidic separation or salting out, or in the form of the solution or the liquid suspension as it is. In a case where the diazonium salt is less soluble and in the form of a liquid suspension, it may be filtered to obtain a pressed cake, which can be used in the succeeding diazotization step.

The secondary or tertiary coupling reaction between the diazotization product of the monoazo amino compound or disazoamino compound and naphthols coupled with the group represented by the formula (4) or the formula (5) is conducted at a temperature of −10 to 40° C. and under an alkaline condition at a pH of 7 to 10. After the completion of the reaction, the product was precipitated by salting out and recovered by filtration. Further, for the formation of a copper complex salt, an aqueous solution thereof is reacted with copper sulfate or copper chloride in the presence, for example, of ammonia, monoethanol amine or diethanol amine at 95 to 100° C., and precipitated by salting out or the like and recovered through filtration. If purification is necessary, salting out may be repeated or the product may be precipitated from water by using an organic solvent.

The organic solvent can include a water soluble organic solvent, for example, alcohols such as methanol and ethanol and ketones such as acetone.

Further, for the polarizing film or the polarizing plate of this invention, the water soluble dye represented by the formula (1) or the copper complex salt dye thereof, or the water soluble dye represented by the formula (6) may be used alone or, optionally, one or more of other organic dyes may be used together. There is no particular restriction on the organic dyes to be used and those dyes having absorption characteristics at a wavelength region different from the wavelength region of the water soluble dye or the copper complex salt dye thereof of the invention and having high dichroism are preferred. They include, for example, C.I. direct yellow 12, C.I. direct yellow 28, C.I. direct yellow 44, C.I. direct orange 26, C.I. direct orange 39, C.I. direct orange 107, C.I. direct red 2, C.I. direct red 31, C.I. direct red 79, C.I. direct red 81, C.I. direct red 247, C.I. direct green 80, C.I. direct green 59, as well as those dyes described in each of the publications of Japanese Published Unexamined Patent Application No. 145255/1984, Japanese Published Unexamined Patent Application No. 156759/1985, Japanese Published Unexamined Patent Application No. 12606/1991 and Japanese Published Unexamined Patent Application No. 218610/1999. The dyes are used as free acid or alkali metal salt, ammonium salt or salts of amines.

When other organic dyes are used together optionally, the blending ratio has no particular restriction but other organic dyes are preferably used generally within a range usually from 0.1 to 10 parts in total based on the mass of the water soluble dye represented by the general formula (1) or the copper complex salt thereof or the water soluble dye represented by the general formula (6).

For the polarizing film of this invention or the polarizing film used for the polarizing plate for the green channel for use in the liquid crystal projector of this invention, polarizing films of various hues and neutral color can be produced by incorporating the water soluble dye represented by the formula (1), or the copper complex salt thereof, or the water soluble dye represented by the formula (6), optionally, together with other organic dyes into a polymer film as a polarizing film material by a known method. The resultant polarizing film is provided with a protective film to form a polarizing plate, optionally provided with a protective layer or an AR layer and a support, which is used for liquid crystal projectors, desk top calculators, watches, note book type personal computers, word processors, liquid crystal television sets, car navigations and instruments or displays of indoor and outdoor use.

The substrate (polymer film) used for the polarizing film of this invention is preferably a polyvinyl alcohol type substrate, and the polyvinyl alcohol type substrate can include, for example, polyvinyl alcohols or derivatives thereof, as well as modification products of one of them with olefins such as ethylene or propylene or unsaturated carboxylic acid such as crotonic acid, acrylic acid, methacrylic acid or maleic acid. Among all, films comprising polyvinyl alcohols or derivatives thereof are used suitably with a view point of the adsorption and the orientation of the dye.

When the water soluble dye represented by the formula (1), or a copper complex salt dye thereof represented by the formula (1) and the water soluble dye represented by the formula (6) are incorporated into the polymer film described above, a method of dyeing the polymer film is usually adopted. Dyeing is conducted, for example, as described below. At first, a water soluble dye is dissolved into water to prepare a dye bath. There is no particular restriction on the concentration of the dye in the dye bath, which is usually selected within a range about from 0.001 to 10% by weight. An auxiliary agent for dyeing may be used optionally. For example, it is suitable to use sodium sulfate at a concentration of about 0.1 to 10% by weight. The polymer film is immersed in the thus prepared dye bath to dye. The dyeing temperature is preferably about from 40 to 80° C.

The dyed polymer film is stretched to orientate the water soluble dye (dichroic colorant). Any of known methods for stretching, for example, a wet method or dry method may be used. The polymer film may be stretched before dyeing depending on the case. In this case, The water soluble dye is oriented by dyeing. The polymer film in which the water soluble dye is incorporated and oriented is optionally applied with a post treatment such as a boric acid treatment by a known method. Such a post treatment is applied for improvement the light transmittance and the degree of polarization of the polarizing film. The condition for the boric acid treatment differs depending on the kind of the polymer film used and the kind of the dye used. The boric acid concentration in the aqueous boric acid solution is generally within a range from 0.1 to 15% by weight and, preferably from 1 to 10% by weight, and the treatment temperature is 30 to 80° C., 40 to 75° C. Further, a fixing treatment maybe conducted together in an aqueous solution containing a cationic polymeric compound depending on the requirement.

A protective film having excellent optical transparency and mechanical strength can be stuck on one or both sides the thus obtained dye type polarizing film to form a polarizing plate. The material forming the protective film may be those used so far. The films include, for example, cellulose acetate type films or acrylic films, as well as fluoric type film such as of tetrafluoroethylene/hexafluoropropylene copolymers, films comprising polyester resin, polyolefin resin or polyamide resin.

A transparent protective layer may further be provided to the surface of the polarizing plate of this invention. The protective layer can include, for example, acrylic or polysiloxane type hard coat layer or urethane type protective layer. Further, for improving the single plate transmittance, an AR (antireflection layer) is preferably disposed on the protective layer. The AR layer can be formed, for example, by vapor depositing or sputtering of a substance such as silicon dioxide or titanium oxide and can also be formed by thinly coating a fluoric substance. An elliptic polarizing plate formed by appending a phase difference plate to the polarizing plate is also included in the polarizing plate referred to in this invention.

The thus constituted polarizing plate has a feature of having a neutral color, causing no color leakage at the crossed state in a visible light region, particularly, in a wavelength region of 400 to 700 nm, having excellent polarizing performance, causing no discoloration or lowering of the polarizing performance at higher temperature and high humidity state and with less light leakage at the crossed state in the visible light region.

The polarizing plate of this invention used for the green channel for use in the liquid crystal projector has a polarizing film containing a water soluble dye represented by the formula (6) and having a maximum absorption wavelength ($\lambda$max) at 520 nm or more and less than 580 nm as the dichroic molecule, further, optionally with other organic dyes described above. Further, the polarizing film of this invention used in the polarizing plate for the green channel for use in the liquid crystal projector is also produced by the process described in the production process of the polarizing film according to this invention described above, further, provided with a protective film to form a polarizing plate and, optionally, provided with a protective layer, or an AR layer and a support and used as the polarizing plate used for a green channel for use in the liquid crystal projector.

The maximum absorption wavelength ($\lambda$max) means the maximum absorption wavelength at the state where two polarizing plate dyed with the dichroic dye represented by the formula (6) are stacked such that the orientation directions thereof are crossed to each other.

To be used for the green channel for use in the liquid crystal projector the polarizing plate preferably has a single plate average transmittance of 39% or more and an average transmittance at the crossed state of 0.4% or less at 500 to 580 nm, and an average transmittance at the crossed state of 60% or more at 630 to 780 nm and, more preferably, the polarizing plate has a single plate average transmittance of 41% or more, and an average transmittance at the crossed state of 0.3% or less at 500 to 580 nm and, more preferably, 0.2% or less, and the average transmittance at the crossed state of 70% or more at 630 to 780 nm. Further preferably, the polarizing plate has a single plate average transmittance of 42% or more, an average transmittance at the crossed state of 0.1% or less at 500 to 580 nm and an average transmittance at the crossed state at 630 to 780 nm of 80% or more. The polarizing plate described above exhibits red under a natural light which is called as a color polarizing plate. The color polarizing plate for the green channel of this invention has brightness and excellent polarizing performance as described above.

The polarizing plate for use in the liquid crystal projector according to this invention may be formed as a polarizing plate with an AR layer by further providing an AR layer to a polarizing plate comprising a polarizing film and a protective layer. Further, a support such as a transparent glass plate may be provided to the polarizing plate comprising the polarizing film and the protective film or the polarizing plate with the AR layer to form a polarizing plate with a support.

The single plate average transmittance is an average value of the light transmittance at a specified wavelength region upon incidence of a natural light to a polarizing plate with no AR layer and no support such as a transparent glass plate (when simply referred to as a polarizing plate, it is used hereinafter also in the same meaning). The average transmittance at the crossed state is an average value of the light transmittance at a specified wavelength region upon incidence of natural light to two polarizing plates with the orientation directions being arranged in a crossed state.

The polarizing plate for use in the liquid crystal projector according to this invention is preferably a polarizing plate with support in which the polarizing plate is struck on the support such as a transparent glass. Further, a polarizing plate with the AR layer and the support, in which the polarizing plate having the AR layer is struck on the support, is more preferred.

The polarizing plate for use in the liquid crystal projector according to this invention is usually used as a polarizing plate with a support. The support preferably has a planar portion for sticking the polarizing plate and it is preferably a glass molded product since this is for optical application use. The glass molding product can include, for example, glass plate, lens, prism (trigonal prism, cubic prism). A lens appended with the polarizing plate can be utilized as a condenser lens with a polarizing plate in the liquid crystal projector. Further, a prism appended with the polarizing plate can be utilized as a polarizing beam splitter with a polarizing plate or a dichroic prism with a polarizing plate in the liquid crystal projector. Further, it may be appended to a liquid crystal cell. The material for the glass can include, for example, inorganic type glass such as soda glass, borosilicate glass or sapphire glass, as well as organic glass such as of acrylic or polycarbonate type. The inorganic type glass being preferred. The thickness and the size of the glass plate may be of a desired dimension. Further, for the polarizing plate with glass, it is preferred to provide an AR layer to one or both of the surfaces of the glass surface or the polarizing plate surface in order to further improve the single plate light transmittance.

A polarizing plate with the support for use in a liquid crystal projector can be produced, for example, by coating a transparent bonding (adhesive) agent to a planar portion of a support, and then being stuck on the polarizing plate of this invention in the coated surface. Alternatively, a transparent bonding (adhesive) agent may be coated on a polarizing plate and a support may be stuck on its coated surface. The bonding (adhesive) agent used herein is, preferably, acrylic ester type. Further, when an elliptic polarizing plate is used as the polarizing plate, the surface of the plate on the side of a phase difference plate is usually stuck on the support but the side of the polarizing plate may be stuck on the glass molding product.

In the color liquid crystal projector using the polarizing plate according to this invention, the polarizing plate, more preferably, the color polarizing plate with the support described above is disposed at a green channel portion. The polarizing plate on the incident side of light is exposed to an intense light. Therefore, the temperature is elevated. When the liquid crystal cell and the polarizing plate on the light incident side are in close contact with each other as in the usual liquid crystal display elements, heat of the polarizing plate on the light incidence side transmits to the liquid crystal cell, and the temperature of the liquid crystals in the liquid crystal cell exceeds an NI point (phase transition temperature: nematic-isotropic phase transmission point) and display is not possible. In order to avoid this, the liquid crystal cell and the polarizing plate on the light incidence side are spaced apart and air or gas is circulated by a cooling blower or the like to prevent overheating of the liquid crystal cell (which may be a water cooling system).

That is, in the color liquid crystal projector using the polarizing plate of this invention, the polarizing plate of the invention is disposed to either one or both of incidence side and emitting side of the liquid crystal cell of the green channel. The polarizing plate may or may not be in contact with the liquid crystal cell but it is preferred not to be in contact in view of the durability. In a system of using a PBS (polarizing beam splitter) behind a light source, an iodine type polarizing plate may be used or the polarizing plate of this invention may be used as the polarizing plate on the incident side. In a case where the polarizing plate is in contact with the liquid crystal cell on the emitting side, the polarizing plate of this invention having the liquid crystal cell as a support can be used. In a case where the polarizing plate is not in contact with the liquid crystal cell, the polarizing plate of the invention using a support other than the liquid crystal cell is used preferably. Further, in view of the durability, it is preferred to dispose the polarizing plate of the invention on both of the incident side and the emitting side of the liquid crystal cell and it is further preferred to dispose the surface of the polarizing plate of this invention on the side of the liquid crystal cell and the surface of the support the side of the light source. The incident side of the liquid crystal cell means the side for the light source and the opposite side is referred to as the emitting side.

In the color liquid projector using the polarizing plate according to this invention, a UV-ray cut filter is preferably disposed between the light source and the polarizing plate with the support on the incident side. Further, the liquid crystal cell to be used is, for example, an active matrix type and is preferably formed by sealing liquid crystals between a transparent substrate formed with an electrode and TFT and a transparent substrate formed with a counter electrode. Light emitted from a light source such as a metal halide lamp is passed through the UV-ray cut filter and separated into trichromatic colors and then the green light is passed through the color polarizing plate with the support for the green channel of this invention and then joined with other dichromatic colors, magnified by a projection lens and then projected on a screen.

The polarizing plate used for the green channel in the color liquid crystal projector thus constituted can provide a color polarizing plate for the green channel having excellent brightness and polarizing performance of 41% or more of single plate average transmittance and 0.2 or less of average transmittance at the crossed state at an absorption wavelength region of 500 to 580 nm.

EXAMPLE

This invention is to be explained further specifically by way of examples but they are only illustrative and no way restrict the invention. % and parts in the examples are on the mass basis unless otherwise specified.

Synthesis Example 1, Synthesis of Compounds No. 1 and No. 16.

(a) 29.9 parts of 4-aminoazobenzene-4'-sodium sulfonate were added to 600 parts of water and dissolved at 70° C. They were cooled to 30° C. or lower and 32 parts of 35% hydrochloric acid were added and then 6.9 parts of sodium nitrite were added and stirred at 25 to 28° C. for 2 hours. After adding 12.1 parts of 2,5-dimethyl aniline and stirring at 25 to 30° C. for 2 hours, pH was adjusted to 3 with addition of sodium carbonate and stirring was conducted further to complete coupling reaction, and filtration was conducted to obtain a disazo compound. After dispersing the resultant disazo compound into 600 parts of water, 32 parts of 35% hydrochloric acid and then 6.9 parts of sodium nitrite were added and stirred at 25 to 30° C. for 2 hours to conduct diazotize.

On the other hand, 35.8 parts of N-(4'-aminobenzoyl)J acid were added to 250 parts of water, rendered weakly alkaline with sodium carbonate and dissolved. The diazotization product of the disazo compound obtained previously was poured in this solution while being kept at neutral to weakly alkaline condition, and stirred to complete the coupling reaction. The product was salted out with sodium chloride and filtered to obtain a water soluble dye (Na salt) of trisazo compound as Compound No. 1.

(b) A water soluble dye as Compound No. 16 (Na salt) was obtained by using 2,5-diethylaniline instead of 2,5-dimethylaniline.

Synthesis Example 2, Synthesis of Compound No. 2

17.3 parts of sulfanyl acid were added to 500 parts of water and dissolved with sodium hydroxide. They were cooled to 10° C. or lower and 32 parts of 35% hydrochloric acid were added and then 6.9 parts of sodium nitrite were added and stirred at 5 to 10° C. for one hour. 13.7 parts of p-cresidine dissolved in an aqueous diluted hydrochloric acid were added and, while stirring at 10–15° C., adjusted to pH 3 with addition of sodium carbonate and stirred further to complete the coupling, and filtered was conducted to obtain a monoazo compound. After dispersing the resultant monoazo compound into 600 parts of water, 32 parts of 35% hydrochloric acid and then 6.9 parts of sodium nitrite were added and stirred at 25° C. to 30° C. for 2 hours. 15.3 parts of 2,5-dimethoxyaniline dissolved in an aqueous diluted hydrochloric acid were added and while being stirred at 20 to 30° C., adjusted to pH to 3 with addition of sodium carbonate and stirred further to complete the coupling reaction, and filtered to obtain a disazo compound. After dispersing the resultant disazo compound into 600 parts of water, 32 parts of 35% hydrochloric acid and then 6.9 parts of sodium nitrite were added and stirred at 25 to 30° C. for 2 hours to diazotize.

On the other hand, 35.8 parts of N-(4'-aminobenzoyl) J acid were added to 250 parts of water and dissolved while being rendered weakly alkaline with sodium carbonate. The diazotization product of the disazo compound obtained previously was poured into the solution while being kept at a neutral to weakly alkaline condition, and stirred to complete the coupling reaction. It was salted out by sodium chloride and filtered to obtain an aqueous dye of trisazo compound (Na salt) as Compound No. 2.

Synthesis Example 3, Synthesis of Compound No. 3

40 parts of the compound obtained in Synthesis Example 2 were dispersed in 500 parts of water and 15 parts of crystalline copper sulfate and 15 parts of monoethanol amine were added and heated to 95° C. and reacted for 10 hours. The reaction solution was salted out with addition of sodium chloride and filtered to obtain a copper complex salt dye (Na salt) as Compound No. 3.

Synthesis Example 4, Synthesis of Compound No. 6

(a) 44.4 parts of sodium 4-nitro-4'-aminostylbene-2,2'-disulfonate was added to 600 parts of water and dissolved at 70° C. They were cooled to 30° C. or lower and 32 parts of 35% hydrochloric acid and then 6.9 parts of sodium nitrite were added and stirred at 25 to 30° C. for 2 hours. After adding 15.3 parts of 2,5-dimethoxy aniline and stirring at 25 to 30° C. for 2 hours, pH was adjusted to 3 with addition of sodium carbonate and they were stirred further to complete the coupling reaction and filtered to obtain a monoazo compound. After dispersing the resultant monoazo compound into 600 parts of water, 32 parts of 35% hydrochloric acid and then 6.9 parts of sodium nitrite were added and stirred at 25 to 30° C. for 2 hours to conduct diazotize and obtain a monoazo diazotization reaction solution.

On the other hand, 24.0 parts of J acid were dispersed in 250 parts of water and dissolved by adding 12 parts of sodium hydroxide and 19 parts of tosyl chloride were added and stirred at 35 to 40° C. for 1 hour. 42 parts of 35% hydrochloric acid and then 6.9 parts of sodium nitride were added to the solution and stirred at 10 to 15° C. for 2 hours. Then after adding 9.4 parts of phenol, sodium hydroxide was added to adjust pH to 9 and they were stirred at 10 to 15° C. to complete the coupling reaction. 6 parts of sodium hydroxide were added to the reaction solution and stirred at 80° C. for 3 hours to cause hydrolysis. After cooling to 20 to 30° C., 35% hydrochloric acid was added to adjust pH to 7, then salted out with addition of sodium chloride and filtered to obtain 6-(4'-hydroxyphenylazo)-3-sulfonic acid-1-naphthol as the monoazo compound. The monoazo compound was added to 300 parts of water and dissolved with addition of sodium hydroxide.

The monoazo diazo reaction solution obtained previously was added to the solution in which the monoazo compound was dissolved while being kept at a weakly alkaline condition with sodium carbonate, and stirred at 15 to 25° C. to complete the coupling reaction. The reaction solution was salted out with addition of sodium chloride and filtered to obtain a water soluble dye of trisazo compound (Na salt) as Compound No. 6.

Synthesis Example 5, Synthesis of Compound No. 7

40 parts of the compound obtained in Example 4 were dispersed in 500 parts of water, 15 parts of crystalline copper sulfate and 10 parts of monoethanol amine were added and heated at 95° C. to react for ten hours. The reaction solution was salted out with addition of sodium chloride and filtered to obtain a water soluble dye (Na salt) as the copper complex salt dye as Compound No. 7.

Synthesis Example 6, Synthesis of Compound No. 8

Water soluble dye (Na salt) as Compound No. 8 was obtained by using p-cresidine instead of 2,5-dimethoxyaniline used in Synthesis Example 4.

Example 1

A polyvinyl alcohol of 75 μm thickness was immersed for 4 minutes in an aqueous solution being 45° C. and having the concentration of 0.03% of the dye of Compound No. 1 obtained in Synthesis Example 1 and 0.1% of sodium sulfate. The film was stretched by five times at 50° C. in an aqueous 3% boric acid solution and washed with water and dried while being kept in a stretched state to obtain a polarizing film. The obtained polarizing film had a maximum absorption wavelength at 550 nm, the polarizing film had a high degree of polarization and showed durability for a long time even in a high temperature and high humidity state.

Example 2

A polyvinyl alcohol of 75 μm thickness was immersed for 4 minutes in an aqueous solution being 45° C. and having the concentration of 0.03% of the dye of compound No. 3 obtained in Synthesis Example 3 and 0.1% of sodium sulfate and. The film was stretched by five times at 50° C. in an aqueous 3% boric acid solution and washed with water and dried while being kept in a stretched state to obtain a polarizing film. The obtained polarizing film had a maximum absorption wavelength at 630 nm, the polarizing film had a high degree of polarization and showed durability for a long time even in a high temperature and high humidity state.

Example 3

A polyvinyl alcohol of 75 μm thickness was immersed for 4 min in an aqueous solution being 45° C. and having the concentration of 0.04% of the dye of Compound No. 1 obtained in Synthesis Example 1, 0.03% of C.I. direct orange 39, 0.04% of a dye represented by the following structural formula (8) laid-open in Example 1 of Japanese Published Unexamined Patent Application No. 12606/1991, 0.03% of a dye represented by the following structural formula (9) laid open in Example 38 of Japanese Published Unexamined Patent Application No. 156759/1985 and 0.1% of sodium sulfate. The film was stretched by five times at 50° C. in an aqueous 3% boric acid solution and washed with water and dried while being kept in a stretched state to obtain a polarizing film. The obtained polarizing film was of a neutral color, had a high degree of polarization and showed durability for a long time even under high temperature and high humidity.

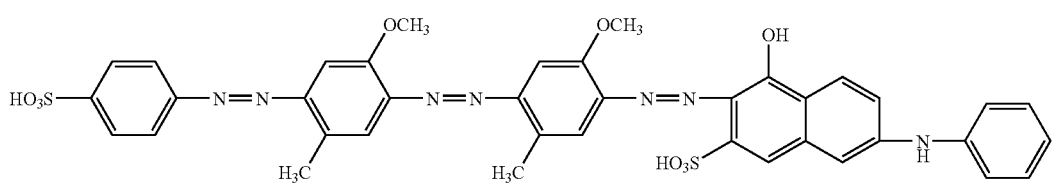

(8)

-continued

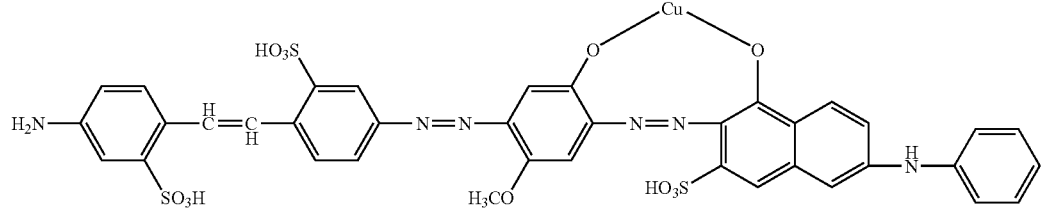

(9)

Example 4

A polyvinyl alcohol of 75 μm thickness was immersed for 4 min in an aqueous solution being 45° C. having the concentration of 0.03% of the dye of Compound No. 1, 0.04% of the dye of Compound No. 2 and 0.04% of the dye of Compound No. 3 obtained in Synthesis Examples 1 to 3, 0.03% of C.I. direct orange 39, and 0.1% of sodium sulfate. The film was stretched by five times at 50° C. in an aqueous 3% boric acid solution and washed with water and dried while being kept in a stretched state to obtain a polarizing film. The obtained polarizing film was of a neutral color, had a high degree of polarization and showed durability for a long time even under high temperature and high humidity.

Example 5

A polyvinyl alcohol of 75 μm thickness was immersed for 4 minutes in an aqueous solution being 45° C. and having the concentration of 0.03% of the dye of Compound No. 6 obtained in Synthesis Example 4 and 0.1% of sodium sulfate. The film was stretched by 5 times at 50° C. in an aqueous 3% boric acid solution and washed with water and dried while being kept in a stretched state to obtain a polarizing film. The obtained polarizing film had a maximum absorption wavelength at 615 nm, the polarizing film had a high degree of polarization and exhibited durability for long time in a high temperature and high humidity state.

Example 6

A polyvinyl alcohol of 75 μm thickness was immersed for 4 minutes in an aqueous solution being 45° C. and having the concentration of 0.03% of the dye of Compound No. 7 obtained in Synthesis Example 5 and 0.1% of sodium sulfate. The film was stretched by 5 times at 50° C. in an aqueous 3% boric acid solution and washed with water and dried while being kept in a stretched state to obtain a polarizing film. The obtained polarizing film had a maximum absorption wavelength at 665 nm, the polarizing film had a high degree of polarization and exhibited durability for long time in a high temperature and high humidity state.

Example 7

A polyvinyl alcohol of 75 μm thickness was immersed for 4 minutes in an aqueous solution being 45° C. and having the concentration of 0.05% of the dye of Compound No. 7 obtained in Synthesis Example 5, 0.04% of the dye of Compound No 0.8 obtained in Synthesis Example 6, 0.03% of C.I. direct orange 39, 0.03% of C.I. direct red 81 and 0.1% of sodium sulfate. The film was stretched by five times at 50° C. in a 3% aqueous boric acid solution and washed with water and dried while being kept in a stretched state to obtain a polarizing film. The obtained polarizing film exhibited a neutral color, had a high degree of polarization and exhibited durability for a long time even in a high temperature and high humid state.

Example 8

A polyvinyl alcohol of 75 μm thickness was immersed for 4 minutes in an aqueous solution being 45° C. having the concentration of 0.05% of the dye of Compound No. 7 obtained in Synthesis Example 5, 0.03% of C.I. direct orange 39, 0.03% of C.I. direct dye red 81, 0.04% of a dye shown by the following structural formula (10) as described in Example 1 of the specification of Japanese Patent Application No. 218610/1999 and 0.1% of sodium sulfate. The film was stretched by five times at 50° C. in a 3% aqueous boric acid solution and washed with water and dried while being kept in a stretched state to obtain a polarizing film. The obtained polarizing film exhibited a neutral color, had a high degree of polarization and exhibited durability for a long time even in a high temperature and high humid state.

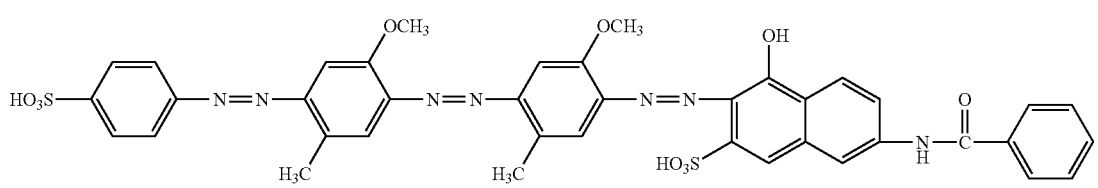

(10)

Example 9

A polyvinyl alcohol of 75 μm thickness was immersed for 4 minutes in an aqueous solution being 45° C. and having the concentration of 0.03% of the dye of Compound No. 1 obtained in Synthesis Example 1 and 0.1% of sodium sulfate. The film was stretched by five times at 50° C. in an aqueous 3% boric acid solution and washed with water and dried while kept in a stretched state to obtain a polarizing film. A polarizing plate (color polarizing plate) was obtained by sticking, with a PVA type adhesive, a TAC film (80 μm thickness, trade name of products: 80 UV TAC, manufactured by Fuji Photographic Film Inc.) on one surface of the obtained polarizing film and a film prepared by forming a UV (UV-ray) curable type hard coat layer of about 10 μm thickness on one side of a TAC film on the other surface of the polarizing film. An acrylic ester type adhesive is applied on one side of the polarizing plate to form a color polarizing plate with an adhesive layer and, further, an AR (anti-reflection) multi-coating was applied by vacuum vapor deposition to the outside of the hard coat layer, which was cut into 30 mm to 40 mm size, and stuck on a transparent glass plate with an AR layer on one side of an identical size to obtain a color polarizing plate with AR support of the invention (for green channel of a liquid crystal projector). The color polarizing plate of this example had a maximum absorption wavelength (λmax) at 550 nm, a single plate average transmittance was 42% and an average transmittance at crossed state of 0.2% or less at 500 to 580 nm and the average transmittance at crossed state at 630 to 780 nm was 80%.

Example 10

Using the dye of Compound No. 16 obtained in Synthesis Example 1(b), a polarizing film, a color polarizing plate and a color polarizing plate with an AR support (for use in green channel of a liquid crystal projector) were prepared successively in the same method as in Example 9. The color polarizing plate of this example had a maximum absorption wavelength (λmax) at 550 nm, 42% of a single plate average transmittance, 0.2% or less of average transmittance at crossed state at 500 to 580 nm, and 80% of an average transmittance at crossed state at 630 to 780 nm.

Example 11

Using 0.04% of the dye of Compound No. 1 obtained in Synthesis Example 1 and 0.02% of C.I. direct orange 39, a polarizing film, a color polarizing plate and a color polarizing plate with an AR support (for green channel for use in a liquid crystal projector) were prepared successively in the same method as in Example 9. The color polarizing plate of this example had 42% of a single plate average transmittance, 0.2% or less of an average transmittance at a crossed state at 500 to 580 nm and 80% of an average transmittance at a crossed state at 630 to 780 nm.

INDUSTRIAL APPLICABILITY

Since the polarizing plate containing the water soluble dye or the copper complex salt compound according to this invention has high polarizing performance comparable with the polarizing plate using iodine and is excellent also in durability, it is suitable to various kinds of liquid crystal displays, among all, to the display use in car-loaded application use, color polarizing plates of the green channel for use in liquid crystal projectors and industrial instruments used in various circumstances requiring high polarizing performance and durability.

What is claimed is:

1. A polyvinyl alcohol polarizing film containing, in a substrate for the polarizing film, a water soluble dye represented by the following formula (1) in the form of a free acid:

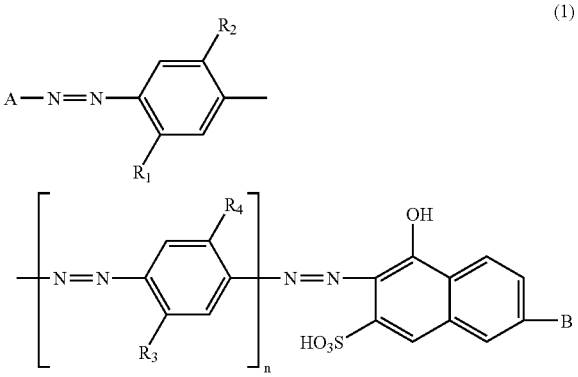

wherein A represents the following formula (2):

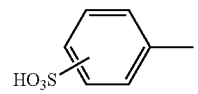

B represents the following formula (4):

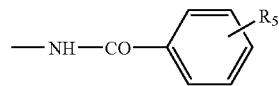

n is 1, $R_5$ in the formula (4) represents an amino group or a hydroxyl group, $R_1$, $R_2$, $R_3$, $R_4$ each independently represents a hydrogen atom, methyl group, ethyl group, methoxy group, ethoxy group and acetyl amino group, or a copper complex salt dye thereof, with the proviso that the following compounds and copper complex salts thereof are excluded:

(1) a compound wherein all of $R_1$, $R_2$, $R_3$ and $R_4$ are methyl groups, and $R_5$ in the formula (4) represents an amino group or a hydroxyl group, (2) a compound wherein all of $R_1$, $R_2$, $R_3$ and $R_4$ are methoxy groups and $R_5$ in the formula (4) represents an amino group or a hydroxyl group, and (3) a compound wherein $R_1$ and $R_3$ are methyl groups and $R_2$ and $R_4$ are methoxy groups, and $R_5$ in the formula (4) represents an amino group or a hydroxyl group.

2. A polyvinyl alcohol polarizing film as defined in claim 1, containing at least one of the water soluble dye represented by the formula (1) or the copper complex salt thereof and at least one organic dye other than the above.

3. A polyvinyl alcohol polarizing plate having a protective film on the surface of the polyvinyl alcohol polarizing film as defined in claim 1 or 2.

4. A polyvinyl alcohol polarizing film for a green channel used for a liquid crystal projector containing, in a substrate for the polarizing film, a water soluble dye represented by the following formula (6):

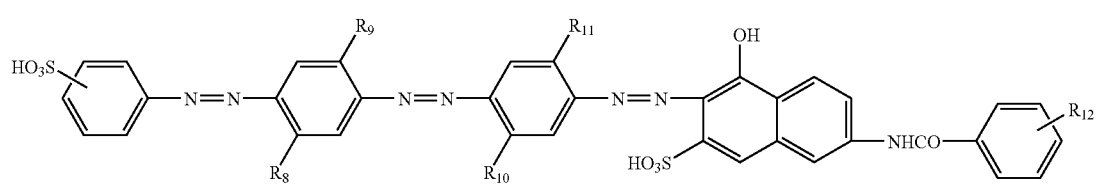

(6)

wherein $R_8$, $R_9$, $R_{10}$ and $R_{11}$ each independently represents a hydrogen atom, methyl group, ethyl, methoxy group, ethoxy group and acetyl amino group, and $R_{12}$ represents an amino group or hydroxyl group, wherein the water soluble dye is in a free acid form and has a maximum absorption wavelength of 520 nm or more and less than 580 nm; with the proviso that the following compounds are excluded:

(1) a compound wherein all of $R_8$, $R_9$, $R_{10}$ and $R_{11}$ are methyl groups, and $R_{12}$ represents an amino group or a hydroxyl group;

(2) a compound wherein all of $R_8$, $R_9$, $R_{10}$ and $R_{11}$ are methoxy groups, and $R_{12}$ represents an amino group or a hydroxyl group;

(3) a compound wherein $R_8$ and $R_{10}$ are methyl groups and $R_9$ and $R_{11}$ are methoxy groups, and $R_{12}$ represents an amino group or a hydroxyl group.

5. A polyvinyl alcohol polarizing film for a green channel used for a liquid crystal projector containing at least one of water soluble dyes represented by the formula (6) as defined in claim 4 and at least one of organic dyes other than described above.

6. A polyvinyl alcohol polarizing film for a green channel used for a liquid crystal projector as defined in claim 4 or 5 wherein the average light transmittance for the crossed state at 630 nm to 780 nm is 60% or more.

7. A polyvinyl alcohol polarizing plate having a protective film on the surface of a polyvinyl alcohol polarizing film as defined in claim 4 for a green channel used for a liquid crystal projector.

8. A color liquid crystal projector having the polarizing plate as defined in claim 7 in a green channel portion.

* * * * *